US012173257B2

(12) United States Patent
Arkenljung

(10) Patent No.: US 12,173,257 B2
(45) Date of Patent: Dec. 24, 2024

(54) ROLL OF CLEANING FABRIC AND RELATED APPARATUS AND METHODS

(71) Applicant: BALDWIN JIMEK AB, Arlöv (SE)

(72) Inventor: Ulf Arkenljung, Malmö (SE)

(73) Assignee: BALDWIN JIMEK AB, Arlöv (SE)

( * ) Notice: Subject to any disclaimer, the term of this patent is extended or adjusted under 35 U.S.C. 154(b) by 701 days.

(21) Appl. No.: 17/264,516

(22) PCT Filed: Aug. 13, 2019

(86) PCT No.: PCT/EP2019/071737
§ 371 (c)(1),
(2) Date: Jan. 29, 2021

(87) PCT Pub. No.: WO2020/035499
PCT Pub. Date: Feb. 20, 2020

(65) Prior Publication Data

US 2021/0292687 A1 Sep. 23, 2021

(30) Foreign Application Priority Data

Aug. 15, 2018 (SE) .................................... 1850981-0

(51) Int. Cl.
*C11D 17/00* (2006.01)
*B41F 35/00* (2006.01)
*C11D 1/52* (2006.01)
*C11D 3/20* (2006.01)
*C11D 3/30* (2006.01)
(Continued)

(52) U.S. Cl.
CPC ............ *C11D 17/049* (2013.01); *B41F 35/00* (2013.01); *C11D 1/523* (2013.01); *C11D 3/2044* (2013.01); *C11D 3/2093* (2013.01); *C11D 3/30* (2013.01); *C11D 3/32* (2013.01); *B41P 2235/24* (2013.01); *B41P 2235/50* (2013.01)

(58) Field of Classification Search
CPC ................................ C11D 17/049; B41F 35/00
See application file for complete search history.

(56) References Cited

U.S. PATENT DOCUMENTS 4,822,514 A 4/1989 Becker
5,340,495 A 8/1994 Mulcahy et al.
(Continued)

FOREIGN PATENT DOCUMENTS

CN 104962401 A 10/2015
CN 103525165 B 3/2016
(Continued)

OTHER PUBLICATIONS

International Search Report and Written Opinion for PCT/EP2019/071737 dated Oct. 15, 2019.
(Continued)

*Primary Examiner* — Necholus Ogden, Jr.
(74) *Attorney, Agent, or Firm* — Thompson Coburn LLP

(57) ABSTRACT

A roll of cleaning fabric is used for cleaning printing cylinders of a printing system. The cleaning fabric (13) is impregnated with a cleaning composition containing an organic solvent and a cellulose solubilizer. The roll may be wound around a core (14) and inserted in a removable sealing bag (15) configured to seal around the roll (12) of cleaning fabric (13) in order to prevent the cleaning composition from evaporating before use.

11 Claims, 4 Drawing Sheets

(51) Int. Cl.
*C11D 3/32* (2006.01)
*C11D 17/04* (2006.01)

(56) References Cited

U.S. PATENT DOCUMENTS

| | | | | |
|---|---|---|---|---|
| 5,368,157 | A | 11/1994 | Gasparrini et al. | |
| 5,424,001 | A | 6/1995 | Bayless | |
| 6,035,483 | A | 3/2000 | Gasparrini et al. | |
| 7,219,605 | B2 | 5/2007 | Nishiyama et al. | |
| 2005/0250659 | A1 | 11/2005 | Howey et al. | |
| 2006/0264350 | A1* | 11/2006 | Howey | C11D 17/049 510/295 |
| 2011/0155171 | A1* | 6/2011 | Huang | C11D 17/049 15/104.93 |
| 2012/0291802 | A1* | 11/2012 | Zhu | C11D 17/049 15/209.1 |
| 2014/0143966 | A1* | 5/2014 | Pavan | B41F 35/00 15/104.93 |
| 2016/0250844 | A1 | 9/2016 | Hansson et al. | |

FOREIGN PATENT DOCUMENTS

| | | | |
|---|---|---|---|
| EP | 0088612 | A1 | 9/1983 |
| EP | 0348609 | A2 | 1/1990 |
| EP | 435269 | A1 | 7/1991 |
| EP | 878304 | A1 | 11/1998 |
| EP | 1956075 | A1 | 8/2008 |
| GB | 1365464 | A | 9/1974 |
| GB | 2210892 | A | 6/1989 |
| IT | 102013902161992 | A1 | 12/2014 |
| JP | H02011329 | A | 1/1990 |
| JP | H08336960 | A | 12/1996 |
| JP | 2006182824 | A | 7/2006 |
| JP | 2007-536111 | A | 12/2007 |
| JP | 2016536166 | A | 11/2016 |
| JP | 201794663 | A | 6/2017 |
| JP | 2017096663 | A | 6/2017 |
| WO | 2005113243 | A1 | 12/2005 |
| WO | 2008001496 | A1 | 1/2008 |
| WO | 201236242 | A1 | 3/2012 |
| WO | 2014141817 | A1 | 9/2014 |
| WO | 2018149890 | A1 | 8/2018 |

OTHER PUBLICATIONS

Mieth et al., "Guidance for the identification of polymers in multilayer films used in food contact materials," JRC Technical Reports, 2016, 70 pages.

* cited by examiner

ROLL OF CLEANING FABRIC AND RELATED APPARATUS AND METHODS

CROSS-REFERENCE TO RELATED APPLICATIONS

This application is a U.S. National Phase application of PCT/EP2019/071737, filed on Aug. 13, 2019, claiming the benefit of Swedish Patent Application No. 1850981-0, filed on Aug. 15, 2018, both of which are incorporated herein by reference in their entireties.

TECHNICAL FIELD

The present invention relates to a roll of cleaning fabric impregnated with a cleaning composition for cleaning printing cylinders in a printing system. The invention also concerns a cleaning composition, a cleaning fabric and methods for cleaning printing cylinders and for forming the roll.

BACKGROUND

In order for printing cylinders to fulfil a desired printing result, such cylinders of a printing system must be cleaned on a regular basis. An example of a cleaning apparatus for a printing system is shown in U.S. Pat. No. 7,219,605B2. Several different cleaning methods are known, such as spraying a cleaning liquid on the cylinders or cleaning the cylinders by hand using means of a cleaning fabric which has been dipped into a cleaning liquid.

The cleaning fabric is often pre-impregnated with a cleaning composition which is configured to dissolve and remove ink residues from the printing cylinders. Paper residues are prone to adhere to the surfaces of the printing cylinders. The adhered paper debris is difficult to dissolve by the cleaning composition, and hence the paper residues need to be removed from the cylinders before the cleaning process with the cleaning fabric can begin. Therefore, it is common practice to spray the printing cylinders with water by means of spray bars or spray nozzles installed in the printing system. For instance, in US2005250659A1 it is described how water can be sprayed onto cylinders in a printing system to remove dirt and paper residues.

However, the spray bars, nozzles and water tubes leading the water to the nozzles have a tendency to clog due to the hostile environment in the printing system. The surroundings in the printing system contain paper debris, ink residues and other contaminants which can clog the spray devices. Lime contained in the water used can also cause clogging.

Examples of a prior-art equipment trying to solve the issues of clogging pipes and nozzles in printing systems are shown in EP435269A1 and EP878304A1. Further background art is reflected for instance in the documents U.S. Pat. No. 5,340,495A and GB1365464A. From the above it is understood that there is room for improvements regarding the issues with clogged nozzles and pipes in printing systems, etc.

SUMMARY

An object of the present invention is to provide a concept which is improved over prior art and which solves or at least mitigates the problems discussed above. This object is achieved by the technique set forth in the appended independent claims, preferred embodiments being defined in the related dependent claims.

The present invention is—inter alia—based on the idea that the step of spraying the printing cylinders with water can be omitted, if the cleaning liquid itself, also referred to herein as the cleaning composition, can dissolve cellulosic paper residues. The inventor has surprisingly found that the addition of a cellulosic solubilizer, preferably a non-aqueous cellulosic solubilizer, herein also referred to as a water substitute, to the cleaning liquid dissolves paper residues from the printing cylinders. Thus, the first wash step, i.e. spraying with water, can be excluded from the cleaning process of the printing system. The inventive cleaning composition saves time, as many printing systems require cleaning a plurality of times each day. Furthermore, the labour intensive process of cleaning and/or exchanging clogged water tubes or spray bars or nozzles is no longer an issue.

In a first aspect, there is provided a roll of cleaning fabric adapted and configured to clean printing cylinders of a printing system. The cleaning fabric is impregnated with a cleaning composition which comprises an organic solvent and a cellulose solubilizer. This is an advantageous cleaning composition since the cellulosic solubilizer enables the currently common water spray step of the cleaning process of a printing system to be omitted from the cleaning process. The organic solvent gives the cleaning composition its property to dissolve and remove ink from the printing cylinders.

In an embodiment, the cleaning composition comprises less than 10 wt % of water, preferably less than 5 wt % water. In another embodiment, the cleaning composition comprises less than 2 wt % of water. A higher amount of water than 2 wt % present in the cleaning composition may cause the cleaning composition to evaporate. Further, the ink dissolution properties of the cleaning composition will decrease if a higher concentration of water is added to the cleaning composition.

Preferably, the water content of the cleaning composition is less than 1 wt % and most preferred less than 0.5 wt %.

In an embodiment, the cellulose solubilizer comprises an ethanol amine moiety. In this content, an ethanol amine moiety is defined as shown in Formula I. The ethanol amine moiety provides a hydrophilic moiety to the solubilizer promoting the solubilizer to dissolve water soluble contaminants from the printing cylinders, such as paper residues.

(I)

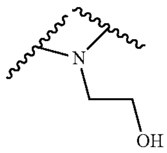

In one embodiment, the cellulose solubilizer in the cleaning composition comprising an ethanol amine moiety is an ethanolamide. Ethanolamides dissolve paper residues and other water soluble impurities adhered to the printing cylinders. Furthermore, the swelling of rubber in the printing system due to contact with the cleaning composition can be kept within an allowable range when using ethanolamides.

In another embodiment, the ethanolamide in the cleaning composition is coconut diethanolamide. In addition to dissolving paper residues from printing cylinders, the addition of coconut diethanolamide has proven to yield a cleaning composition with favourable ink solubility properties. It is likely that coconut diethanolamide dissolves paper efficiently by effectively absorbing moisture from the environment which in turn has the effect of breaking paper dust and dissolving the paper residues from the printing cylinders. It has also been shown that coconut diethanolamide reduces the electrical resistance of the cleaning composition.

In yet another embodiment, the cellulose solubilizer in the cleaning composition comprising an ethanol amine moiety is an ethanolamine. Ethanolamines dissolve paper residues and other water soluble impurities adhered to the printing cylinders. Furthermore, the swelling of rubber in the printing system due to contact with the cleaning composition is within an acceptable range when using ethanolamines.

In a further embodiment, the ethanolamine in the cleaning composition is triethanolamine. In addition to dissolving paper residues from printing cylinders, the addition of trihanolamine has proven to yield a cleaning composition with favourable ink solubility properties.

In one embodiment, the cellulose solubilizer is a glycol ether which is advantageous as a cellulosic solubilizer since these compounds have the favourable solvent properties of lower-molecular weight ethers and alcohols and thus can dissolve paper residues and other water soluble contaminants from the printing cylinders.

In another embodiment, the cellulose solubilizer is a $C_2$-$C_6$ alkane diol. The hydroxyl groups of the $C_2$-$C_6$ alkane diol gives the compounds their hydrophilic properties and enables the compounds to dissolve paper residues and other water soluble contaminating particles.

In yet another embodiment, the $C_2$-$C_6$ alkane diol is ethylene glycol (ethane-1,2-diol) which is a $C_2$ alkane diol with especially favourable properties to dissolve paper residues from the printing cylinders.

In one embodiment, the cellulose solubilizer is a hydrophilic tenside which dissolves water soluble contaminating particles, such as paper residues, from the printing cylinders.

In a further embodiment, the hydrophilic tenside is a super-wetting agent. Preferably, the super-wetting agent is an amphoteric betaine, an anionic organic sulphate or an amine oxide. The super-wetting agent enables the cleaning composition to dissolve water soluble contaminants, such as paper residues, from the printing cylinders. Further, to dissolve paper residues and the like only a small concentration of the super-wetting agent is needed. Thus, the concentration of the super-wetting agent may be as low as 0.05 to 0.1 wt %. To use a low concentration of the cellulosic solubilizer is favourable since the amount of organic solvents, which gives the cleaning composition its ink solubility properties, can be kept at a high level.

In another embodiment, the content of the cellulose solubilizer in the cleaning composition is between 0.05 to 20 wt %, preferably between 0.075 to 10 wt % and most preferred between 0.1 and 5 wt %. The concentration of the cellulosic solubilizer has to be balanced against the concentration of the organic solvent(s). If the concentration of the cellulosic solubilizer is higher than 20 wt %, the ink solubility of the cleaning composition is decreased. If the concentration of the solubilizer is too low, i.e. lower than 0.05 wt %, the cleaning composition will not dissolve and remove paper residues in a favourable way.

In one embodiment, the content of the organic solvent in the cleaning composition is between 80 and 99.05 wt %, preferably between 90 and 99.025 wt % and most preferred between 95 and 99.9 wt %. The concentration of the organic solvent has to be balanced against the concentration of the cellulosic solubilizer. If the concentration of the organic solvent is higher than 99.9 wt %, the concentration of the cellulose solubilizer is too low and the cleaning composition will not be able to dissolve paper residues from the printing cylinders. If the concentration of the organic solvent is too low, i.e. lower than 80 wt %, the cleaning composition will not dissolve and remove ink residues in a favourable way.

In yet another embodiment, the cleaning fabric is wrapped around a core to form the roll. This is preferable since the core may efficiently be mounted on a shaft of a cleaning cassette. Moreover, the cleaning fabric is easy to handle and protected when wound around a core.

In one embodiment, the roll is inserted in a removable sealing bag configured to seal around the roll of cleaning fabric in order to prevent the cleaning composition from evaporating before use. Preferably, the removable sealing bag is made of plastic. The plastic sealing bag prevents the cleaning composition from evaporating. The plastic seal thus gives the roll a longer shelf life before use and protects is from the environment.

In a further embodiment, the roll of cleaning fabric is vacuum packed in the sealing bag. The vacuum packing prevents the cleaning composition from internal migration by diffusion within the bag. An uneven distribution of the cleaning composition, due to its accumulation in certain areas of the roll when stored, yields an uneven cleaning result during use. However, the vacuum packing ensures an even distribution of the cleaning liquid in the roll and thus high quality cleaning result. Further, the shelf life of the roll is prolonged due to the vacuum seal. The vacuum packing also prevents other compounds and/or impurities from entering the sealing bag and damaging the roll of cleaning fabric.

In a second aspect, a cleaning composition adapted and configured to clean printing cylinders of a printing system is provided. The cleaning composition comprises an organic solvent and a cellulose solubilizer. The cleaning composition can be transferred, e.g. sprayed, onto a cleaning fabric or a printing cylinder, which is to be cleaned, without the need for the addition of water to dissolve paper residues from the printing system.

In an embodiment, the cleaning composition comprises less than 10 wt % of water, preferably less than 5 wt % water.

In another embodiment, the cleaning composition comprises less than 2 wt % of water.

In an embodiment, the cellulose solubilizer in the cleaning composition comprises an ethanol amine moiety. In this content, an ethanol amine moiety is defined as shown in Formula I. The ethanol amine moiety provides a hydrophilic moiety to the solubilizer promoting the solubilizer to dissolve water soluble contaminants from the printing cylinders, such as paper residues.

(I)

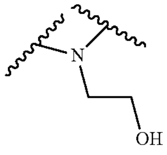

In one embodiment, the cellulose solubilizer in the cleaning composition comprising an ethanol amine moiety is an ethanolamide. Ethanolamides dissolve paper residues and other water soluble impurities adhered to the printing cylinders. Furthermore, the swelling of rubber in the printing system due to contact with the cleaning composition can be kept within an acceptable range when using ethanolamides.

In another embodiment, the ethanolamide in the cleaning composition is coconut diethanolamide. The addition of coconut diethanolamide has proven to yield a cleaning composition with favourable ink solubility properties.

In yet another embodiment, the cellulose solubilizer in the cleaning composition comprising an ethanol amine moiety is an ethanolamine. Ethanolamines, dissolve paper residues and other water soluble impurities adhered to the printing cylinders. Furthermore, the swelling of rubber in the printing system due to contact with the cleaning composition is within an acceptable range when using ethanolamines.

In a further embodiment, the ethanolamine in the cleaning composition is triethanolamine. In addition to dissolving paper residues from printing cylinders, the addition of trihanolamine has proven to yield a cleaning composition with favourable ink solubility properties.

In one embodiment, the cellulose solubilizer is a glycol ether which is advantageous as a solubilizer since these compounds have the favourable solvent properties of lower-molecular weight ethers and alcohols and thus can dissolve paper residues and other water soluble contaminants from the printing cylinders.

In another embodiment, the cellulose solubilizer in the cleaning composition is a $C_2$-$C_6$ alkane diol. The hydroxyl groups of the $C_2$-$C_6$ alkane diol gives the compounds their hydrophilic properties and enables the compounds to dissolve paper residues and other water soluble contaminating particles.

In yet another embodiment, the $C_2$-$C_6$ alkane diol in the cleaning composition is ethylene glycol (ethane-1,2-diol) which is a $C_2$ alkane diol with especially favourable properties to dissolve paper residues from the printing cylinders.

In one embodiment, the cellulose solubilizer in the cleaning composition is a hydrophilic tenside which dissolves water soluble contaminating particles, such as paper residues, from the printing cylinders.

In a further embodiment, the hydrophilic tenside in the cleaning composition is a super-wetting agent. Preferably, the super-wetting agent is an amphoteric betaine, an anionic organic sulphate or an amine oxide. The super-wetting agent enables the cleaning composition to dissolve water soluble contaminants, such as paper residues, from the printing cylinders. Further, to dissolve paper residues and the like only a small concentration of the super-wetting agent is needed. Thus, the concentration of the super-wetting agent may be as low as 0.05 to 0.1 wt %. To use a low concentration of the non-aqueous cellulosic solubilizer is favourable since the amount of organic solvents, which gives the cleaning composition its ink solubility properties, can be kept at a high level.

In another embodiment, the content of the cellulose solubilizer in the cleaning composition is between 0.05 to 20 wt %, preferably between 0.075 to 10 wt % and most preferred between 0.1 and 5 wt %. The concentration of the cellulosic solubilizer has to be balanced against the concentration of the organic solvent(s). If the concentration of the cellulosic solubilizer is higher than 20 wt %, the ink solubility of the cleaning composition is decreased. If the concentration of the solubilizer is too low, i.e. lower than 0.05 wt %, the cleaning composition will not dissolve and remove paper residues in a favourable way.

In one embodiment, the content of the organic solvent in the cleaning composition is between 80 and 99.05 wt %, preferably between 90 and 99.025 wt % and most preferred between 95 and 99.9 wt %. The concentration of the organic solvent has to be balanced against the concentration of the cellulosic solubilizer. If the concentration of the organic solvent is higher than 99.9 wt %, the concentration of the cellulose solubilizer is too low and the cleaning composition will not be able to dissolve paper residues from the printing cylinders. If the concentration of the organic solvent is too low, i.e. lower than 80 wt %, the cleaning composition will not dissolve and remove ink residues in a favourable way.

In a third aspect, there is provided a cleaning fabric adapted and configured to clean printing cylinders of a printing system. The cleaning fabric is impregnated with a cleaning composition, which comprises an organic solvent and a cellulose solubilizer.

In an embodiment, the cleaning composition comprises less than 10 wt % of water, preferably less than 5 wt % water.

In another embodiment, the cleaning composition comprises less than 2 wt % of water. If the cleaning composition comprises more than 2 wt % of water, the cleaning composition will evaporate.

The cleaning fabric may be rubbed or stroked against a printing cylinder manually or installed in other types of cleaning devices not described herein.

In a fourth aspect, there is provided a method for cleaning a printing cylinder of a printing system by means of a cleaning roll. The method comprises the steps of un-winding from the roll at least a portion of the cleaning fabric which is impregnated with a cleaning composition and placing the at least a portion of the cleaning fabric in contact with the printing cylinder.

In a fifth aspect a method for forming a roll is provided. The method comprises the steps of impregnating a cleaning fabric with a cleaning composition, wrapping the cleaning fabric around a core to form a roll, and inserting the roll in a sealable bag, which preferably is vacuum packed.

In one embodiment, the cleaning fabric is impregnated with the cleaning composition after being wrapped around the core. An advantage of this is that the cleaning fabric may be easier to handle and impregnate once it is wrapped around the core. For instance, the cleaning fabric wrapped around the core can be placed in a sealable bag and impregnated while being in the sealable bag. In this way, any loss of the cleaning composition is reduced. This also decreases the spreading of the cleaning composition in the surroundings.

In a sixth aspect, the use of a roll of cleaning fabric for cleaning printing cylinders of a printing system is provided.

BRIEF DESCRIPTION OF THE DRAWINGS

Embodiments of the invention will be described in the following; references being made to the appended diagrammatic drawings, which illustrate non-limiting examples of how the inventive concept can be reduced into practice.

DETAILED DESCRIPTION

Figure 1:
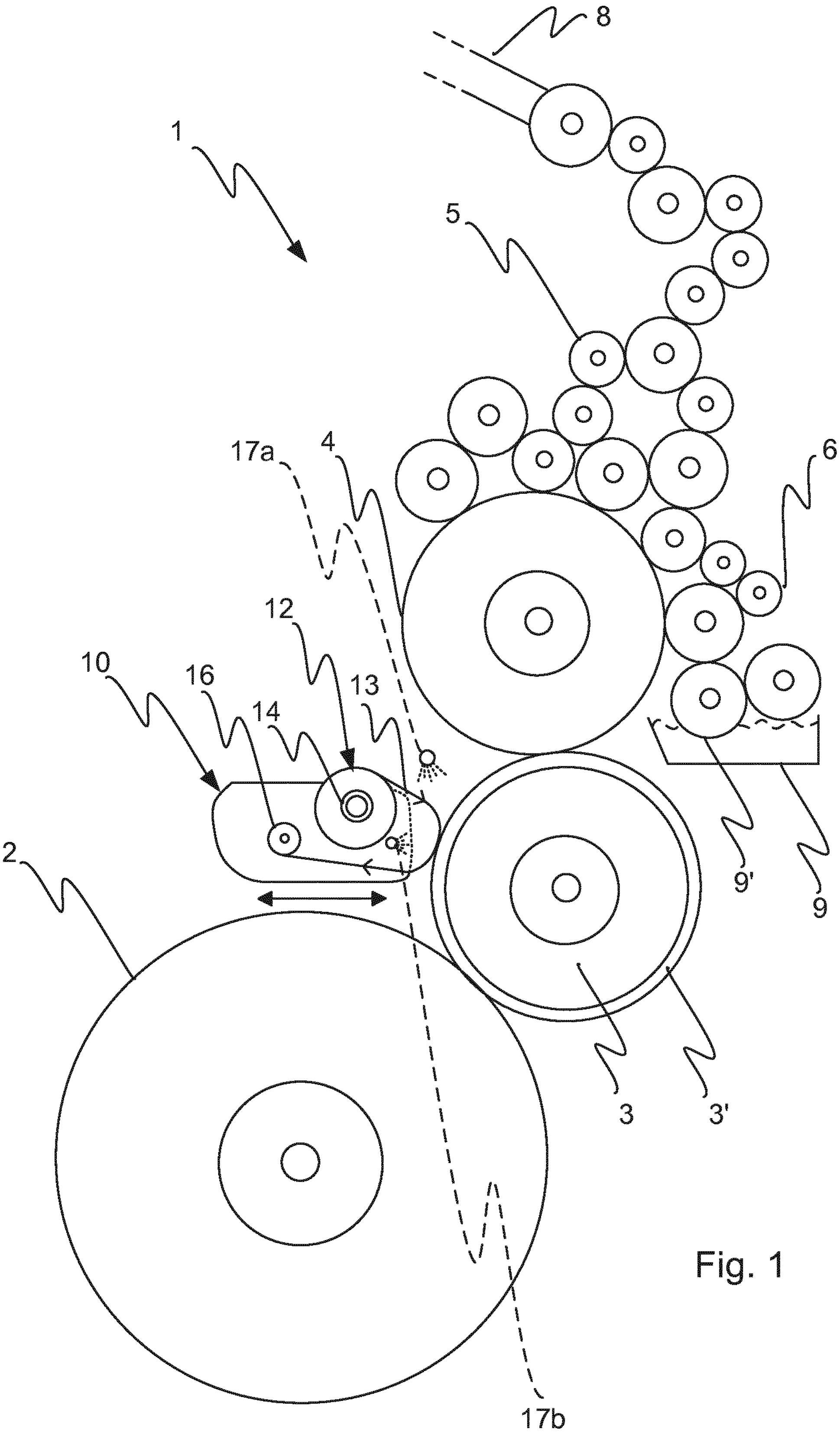
FIG. 1 shows a cross section of a general printing system with a set up of cylinders and a cleaning cassette with a roll of cleaning fabric and a spray nozzle bar.

With reference to FIG. 1, a general printing unit or system 1 with a number of printing cylinders and rollers 2, 3, 4, 5, 6 is illustrated. The printing system 1 described herein has an impression cylinder 2 (the largest printing cylinder, down to the left in FIG. 1), a blanket cylinder 3 (the medium sized cylinder next to the impression cylinder) which has a blanket 3', herein referred to as a rubber sheet 3', and a plate cylinder 4 (the medium sized cylinder next to the blanket cylinder). The blanket 3' is commonly approximately 2 mm thick. The printing system 1 further has a number of inking rollers 5 (small rollers not being damping rollers) and a number of damping rollers 6 (the five small sized rollers down to the right).

Figure 2:
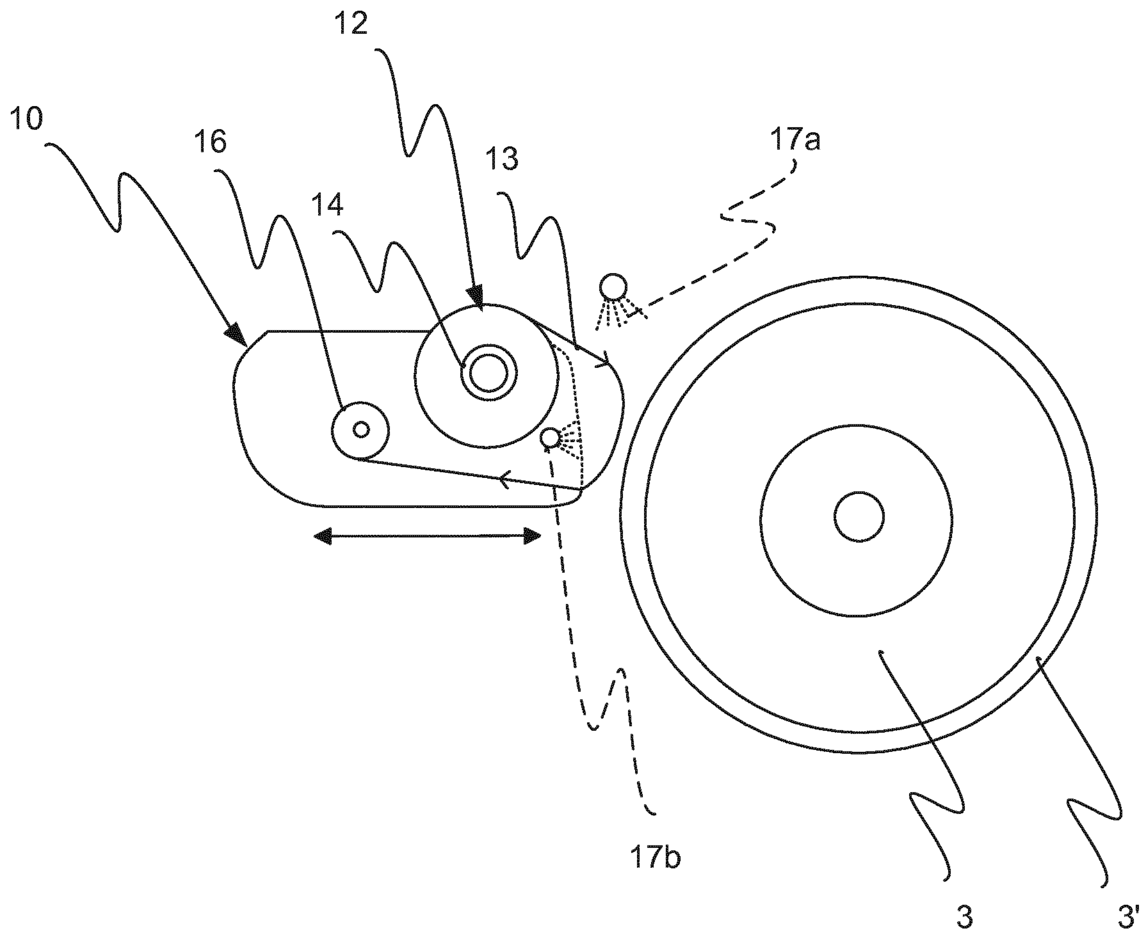
FIG. 2 shows an enlarged portion of FIG. 1.

The set of inking rollers 5 is associated with an ink source 8 which provides the inking rollers 5 with ink. The set of damping rollers 6 is associated with a damping source, in this case a water bath 9, which provides the damping rollers 6 with water. The printing system 1 further comprises a cleaning machine or cleaning cassette 10 which houses a cleaning device or roll 12 with a cleaning fabric 13, also referred to as a cleaning cloth. In FIGS. 1 and 2, spray devices 17*a*, 17*b* used in current cleaning systems are shown. The spray devices 17*a*, 17*b* are shown in dashed lines to indicate that they belong to a currently used cleaning system. The cleaning cassette 10 comprises a spray device 17*a*, 17*b* herein also referred to as a spray nozzle arrangement having spray nozzle set ups either in the position 17*a* or in the position 17*b*. The spray device 17*a*, 17*b* is arranged and configured to spray the rubber sheet 3' of the blanket cylinder 3 with water to remove paper residues and other water soluble debris adhered to the rubber sheet 3' on the printing cylinder 3. As shown in FIGS. 1 and 2, the spray device 17*a*, 17*b* used in current cleaning systems may be arranged inside the cleaning cassette 10 and facing the blanket cylinder 3, or it may be arranged adjacent to the cleaning cassette 10 facing the blanket cylinder 3.

FIG. 2 shows the cleaning cassette 10 of the printing system 1 shown in FIG. 1. The cleaning cassette 10 comprises the cleaning roll 12 which includes a bobbin or core 14. The cleaning fabric 13 has been wrapped or wound around the core 14 which can be solid or hollow and made of any suitable material, for example plastic, paper or metal. It can also have different cross sections, and the design described herein has a circular cross section. The cleaning cassette 10 of FIGS. 1 and 2 further comprises a collecting roller 16.

Figure 3:
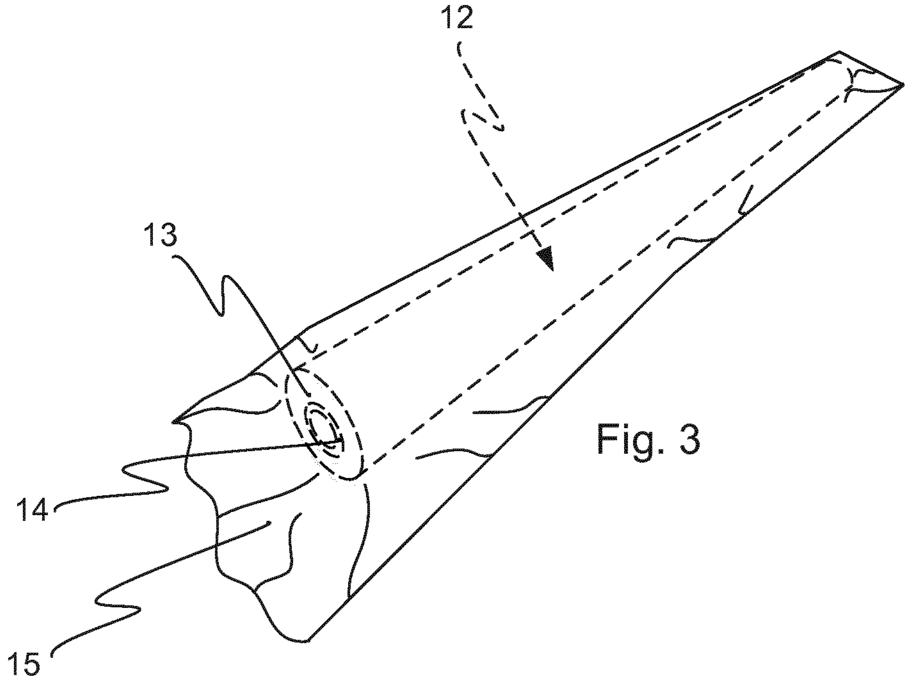
FIG. 3 illustrates the roll in perspective and vacuum-packed in a sealing bag.

FIG. 3 illustrates the roll 12 in perspective view and vacuum-packed in a sealing bag 15 which preferably is made of plastics material. The roll 12 comprises a core 14 and a cleaning fabric 13 wrapped or wound around said core 14. The cleaning fabric 13 has been soaked or impregnated with a cleaning liquid, also referred to herein as a cleaning composition.

Figure 4:
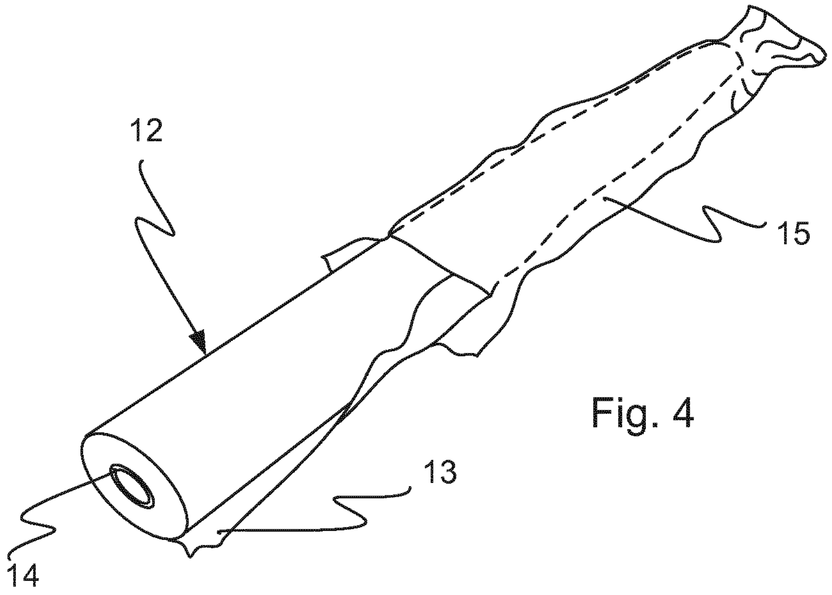
FIG. 4 illustrates the roll shown in FIG. 3 with the sealing bag partially removed.

FIG. 4 illustrates the roll 12 shown in FIG. 3 with the sealing bag 15 partially removed. Preferably, the bag 15 is tubular and built up by a multi-layer plastic film. A suitable plastic film for this purpose is a three-layer film based on a first layer of polyethylene (PE) providing a fluid barrier, a second mid layer of polyamide (PA) providing strength and a third layer of polyethylene (PE) providing a fluid barrier and a sealing layer. This three-layer plastics film has proven to be favourable in practical tests. The thickness of the sealing film is designed in such a way that it is easy to remove from the roll 12, as is shown in FIG. 4. Preferably, the sealing bag 15 is vacuum packed by heat sealing the bag 15.

Figure 5:
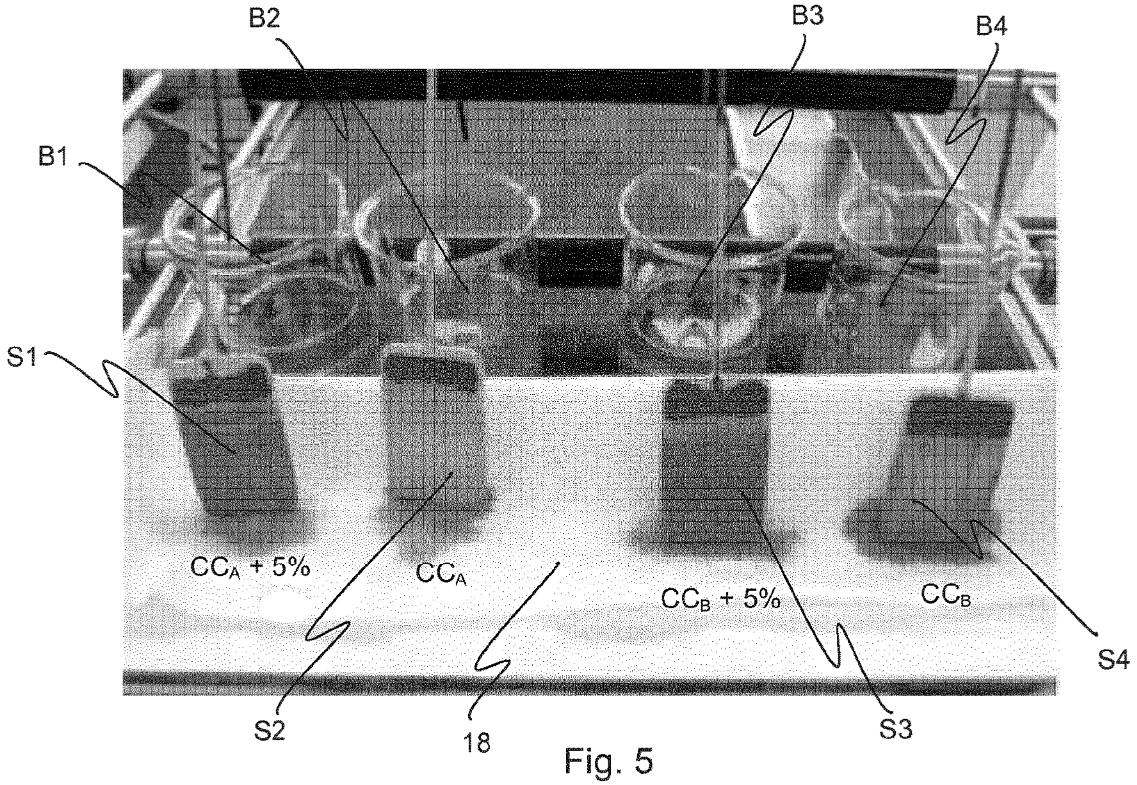
FIG. 5 shows test results from an ink solubility test.
Figure 6:
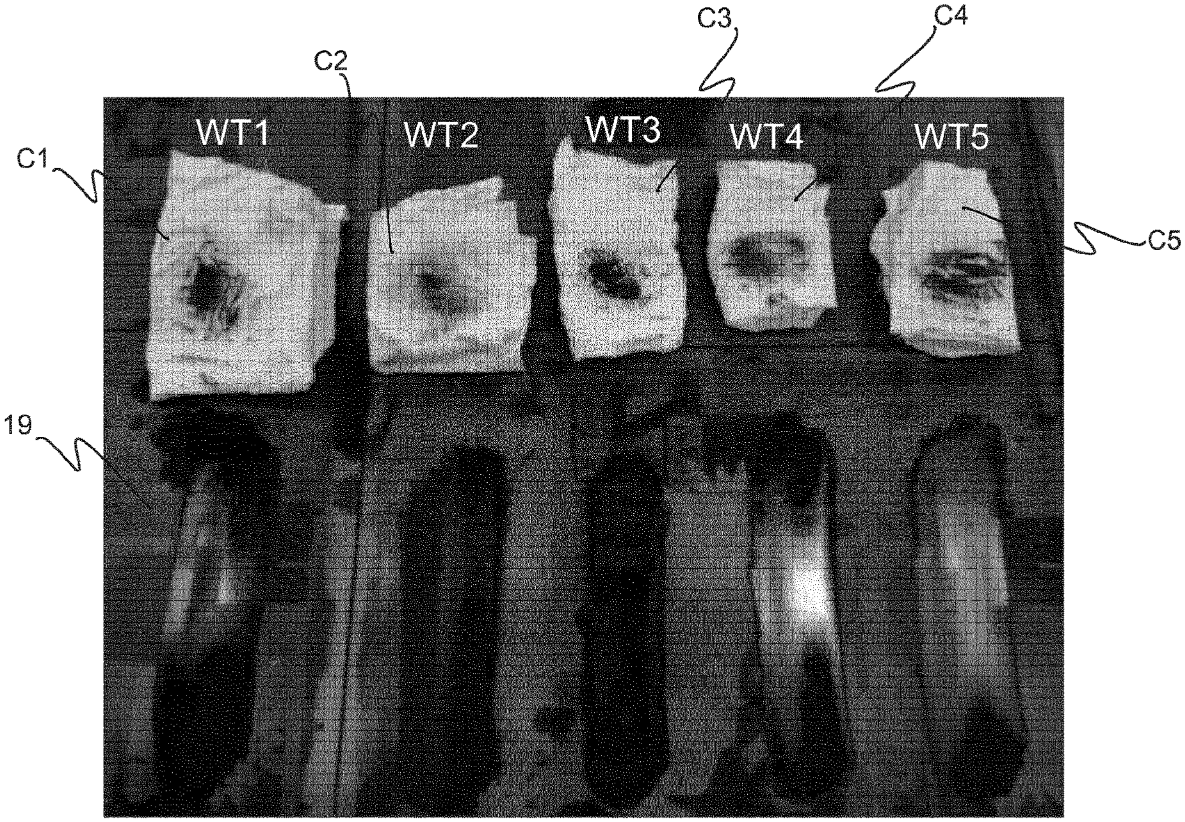
FIG. 6 shows test results from a paper residue and ink wash test.

FIG. 5 shows the test results from an ink solubility test and FIG. 6 shows the results from a paper residue wash test. The experiments and the results will be more thoroughly explained in the experimental section in the following.

The printing work and cleaning of the printing system 1 will now be explained more in detail. With reference to FIG. 1, when the printing system 1 is performing printing work, water is transported towards the cylinders via the damping rollers 6 which collect water from the damping source 9. The water thus arrives and is present at the non-pressured surfaces occurring between the cylinders 2, 3, 4. Ink is then transported by means of the ink rollers 5 which collect ink from the ink source 8, towards the cylinders 3, 4, 5. The print is then transferred to the blanket cylinder 3 and the material, e.g. paper. The material, e.g. paper, which is to receive the print, is arranged between the rubber sheet 3' on the blanket cylinder 3 and the impression cylinder 2. This is where the printing work is conducted and the print is transferred from the rubber sheet 3' to the material. The set up of the cylinders and rollers shown and described herein is only an example of a set up of a printing system.

Depending on type and use, the printing system 1 needs to be cleaned more or less often in order to maintain a sufficient printing quality. Commonly in prior art printing systems, the cleaning process starts by spraying a liquid, most often water, which dissolves cellulose in the form of paper debris and other water soluble impurities which have adhered to the printing cylinders. Once the water soluble contaminants such as paper residues and the like have been removed, the cleaning cassette 10 can perform its cleaning. The cleaning composition which has impregnated the cleaning fabric 13 removes, inter alia, ink residues from the printing cylinders 2, 3, 4, 5.

Cleaning processes known in the art involve two separate steps. The first water washing step, where water is sprayed onto the blanket cylinder, can be time consuming and inefficient. Moreover, the spray devices and water tubes leading water to the spray device clog easily. Clogging in the spray devices and the tubes supplying the spray devices with water occurs due to contamination by paper residues, lime in the water, ink residues and other debris. These contaminating particles penetrates the spray openings of the devices and may also clog the internal cavities of the water tubes.

According to the present disclosure when cleaning the printing system 1, there is no need for a pre-washing step of spraying the blanket cylinder 3 with water with a spray device 17*a*, 17*b* to remove paper residues and other water soluble debris, since paper residues are dissolved by the cleaning composition of the present disclosure.

The cleaning composition of the present disclosure comprises at least one organic solvent to dilute and/or dissolve ink residues and at least one cellulose solubilizer configured to dissolve cellulosic material such as paper debris from the cylinders 2, 3, 4, 5. The water spray step is thus no longer needed, meaning that the spray device 17*a*, 17*b* can be omitted. The cellulosic solubilizer aims to dissolve cellulosic paper debris which is water soluble. However, if water is added to the cleaning composition, the water will evaporate and the cleaning composition will lose its ability to dissolve water soluble impurities. Replacing the water spray step with the addition of water in the cleaning composition is hence not an option. Instead, the cellulosic solubilizer should be a low volatile organic compound (low VOC). The possible groups of compounds presented below from which the cellulosic solubilizer can be selected are all low VOCs.

The concentration of the cellulosic solubilizer in the cleaning composition is between 0.05 to 20 wt %, preferably between 0.06 and 15 wt %, more preferably between 0.075 to 10 wt % and most preferably between 0.1 and 5 wt %. The concentration of the cellulosic solubilizer has to be balanced against the concentration of the organic solvent(s). If the concentration of the cellulosic solubilizer is higher than 20 wt %, the ink solubility of the cleaning composition is decreased. If the concentration of the solubilizer is too low, i.e. lower than 0.05 wt %, the cleaning composition will not dissolve and remove paper residues in a favourable way.

The cellulosic solubilizer may be any compound selected from the group consisting of compounds comprising an ethanol amine moiety, glycol ethers, $C_2$-$C_6$ alkane diols, hydrophilic tensides, super-wetting agents, or a combination of such compounds.

Preferable hydrophilic tensides are so called super-wetting agents, such as an amphoteric betaine, an anionic organic sulphate or an amine oxide. These super-wetting agents are powerful wetting agents, meaning that a low concentration is enough to effectively dissolve cellulosic material. The concentration of the super-wetting agent in the cleaning composition may be as low as 0.1 wt %. Other hydrophilic tensides may also be used in the cleaning composition as the cellulosic solubilizer.

The $C_2$-$C_6$ alkane diol may be for instance propylene glycol, tetramethylene diol (butane-1,4-diol) or ethylene glycol. Preferably the $C_2$-$C_6$ alkane diol is ethylene glycol.

Examples of glycol ethers which may be used as the cellulosic solubilizer are for instance ethylene glycol monomethyl ether, ethylene glycol monoethyl ether, ethylene glycol monoisopropyl ether, ethylene glycol monobutyl ether, ethylene glycol monophenyl ether, ethylene glycol monobenzyl ether, propylene glycol methyl ether, diethylene glycol monomethyl ether, diethylene glycol monoethyl ether, diethylene glycol mono-n-butyl ether, dipropyleneglycol methyl ether, phenoxyethanol, pentaethylene glycol monododecyl ether and alkylene polyglycol ether.

The ethanol amine moiety is herein defined as a —(N($CH_2CH_2OH$))— moiety and as shown in Formula I.

(I)

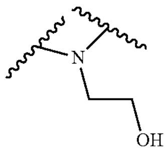

The compound comprising an ethanol amine moiety may be for instance an alkanolamine or alkanolamide, preferably an ethanolamine or ethanolamide, most preferred triethanolamine or coconut diethanolamide.

It is appreciated that a combination of the different cellulose solubilizers presented herein can be used in the cleaning composition according to the present disclosure.

The organic solvent component of the cleaning composition may be for instance distillates (petroleum, hydrotreated light) D100, isooctyl laurate, 2-ethyl hexyl laurate, a propylene glycol oligomer, an unsaturated fatty acid, an ester, such as a fatty acid ester, preferably a saturated fatty acid alkyl ester, a plasticizer, a petroleum-based solvent such as naphthene or paraffin, or a combination thereof, or any other organic solvent dissolving ink residues.

The plasticizer decreases the swelling of the rubber sheet 3'. A preferred plasticizer is diisononyl phthalate (DINP), which also improves the cleaning performance of the cleaning composition and reduces the amount of chemical residues on the blanket cylinder 3 after washing.

The propylene glycol oligomer may for instance be tri(propylene glycol) propyl ether, tri(propylene glycol) methyl ether, tri(propylene glycol) butyl ether, propylene glycol propyl ether, tripropylene glycol, propylene glycol diacetate, ethylene glycol monophenyl ether, di(propylene glycol) propyl ether, di(propylene glycol) methyl ether, di(propylene glycol) dimethyl ether, or di(propylene glycol) butyl ether.

The fatty acid may for instance be myristoleic acid, vaccenic acid, elaidic acid, linoelaidic acid, linoleic acid, palmitoleic acid, sapienic acid, oleic acid, arachidonic acid, eicosapentaenoic acid, erucic acid or docosahexaenoic acid.

The organic solvents used in the cleaning composition are low VOCs to avoid unwanted evaporation of the solvents.

The concentration of the organic solvent is in the cleaning composition is between 80 and 99.05 wt %, preferably between 85 and 99.04 wt %, more preferably between 90 and 99.025 wt % and most preferably between 95 and 99.9 wt %.

Other possible compounds comprised in the cleaning liquid with different properties may be e.g. aliphatic hydrocarbons for cleaning power, vegetable esters for cleaning power and reduction of evaporation, corrosion inhibitors for preventing corrosion and emulsifiers for emulsification with water.

In one embodiment, the cleaning composition comprises an unsaturated fatty acid, a propylene glycol oligomer and a cellulosic solubilizer, preferably coconut diethanolamide.

In a further embodiment, the cleaning composition comprises distillates (petroleum, hydrotreated light) D100, isooctyl laurate, 2-ethyl hexyl laurate and a cellulosic solubilizer, preferably coconut diethanolamide.

In another embodiment, the cleaning composition comprises an ester, preferably a saturated fatty acid alkyl ester, a plasticizer, preferably diisononyl phthalate (DINP), and a cellulosic solubilizer, preferably coconut diethanolamide. Preferred weight concentrations of the ester, the plasticizer and the cellulosic solubilizer in this embodiment is 30 to 50 wt % of the ester, 40 to 60 wt % of the plasticizer and 1 to 5 wt % of the cellulosic solubilizer. Most preferably, the cleaning composition comprises about 40 wt % of the ester, about 57 wt % of the plasticizer DINP and about 3 wt % of the coconut diethanolamide.

In still a further embodiment, the cleaning composition comprises a petroleum-based solvent such as naphthene or paraffin and a cellulosic solubilizer, preferably coconut diethanolamide.

The cleaning composition further comprises less than 2 wt % of water, such as less than 1 wt % of water or such as less than 0.5 wt % of water. A higher content of water than 2 wt % will cause the cleaning composition to evaporate and will dilute the concentration of the cellulosic solubilizer and the organic solvent, which affects the ability of the cleaning composition to dissolve ink and paper debris from the rubber sheet 3'.

The content of the organic solvent and the cellulosic solubilizer in the cleaning composition according to the present disclosure is 98 wt % or more.

Pre-packed cleaning rolls of basic structure are known in the art per se and are described for instance in the publication U.S. Pat. No. 5,368,157A.

According to the present disclosure, the cleaning fabric 13 is a liquid or solvent absorbable material, such as a non-woven material, and is adapted to be impregnated or soaked with the cleaning composition of the present disclosure before starting a cleaning process. Preferably, the cleaning fabric 13 is impregnated or soaked with the cleaning liquid of the present disclosure before being packed and stored or transported, i.e. it can be impregnated or soaked long before it is to be used in a cleaning process. Further, the cleaning fabric 13 can be impregnated or soaked either before or after being wrapped around the core 14.

The cleaning roll 12 shown in FIG. 3 is pre-packed and stored until it is to be used in the cleaning process. The cleaning roll 12 is vacuum packed until the bag 15 is broken before a cleaning process starts. The process of vacuum packing is commonly performed by heat sealing. A multi-layer plastic film of the wrapping prevents the cleaning composition from evaporating. Further, the vacuum packing of the roll 12 prevents the cleaning composition to migrate or diffuse through the cleaning fabric 13. Unwanted diffusion in the cleaning fabric 13 causes an uneven distribution of the cleaning composition and hence a poor and uneven cleaning result.

Before the cleaning process begins, the cleaning roll 12 is taken out of its package or bag 15, as shown in FIG. 4, and arranged on the mounting means 11 in the cleaning cassette 10.

The cleaning cassette 10 is then moved from an idle position, in which the cleaning fabric 13 is not in contact with the rubber sheet 3' of the cylinder 3, to an active position in contact with said rubber sheet 3' of the cylinder 3. The cleaning cassette 10 may also be brought into contact with other cylinders of the printing system, such as the impression cylinder 2. The cylinders 2, 3, 4, 5, 6 are rotated in the opposite direction of that when using the printing system for printing. The cleaning composition will thus be transferred from the cleaning fabric 13 onto the rubber sheet 3' of the cylinder 3 and further onto the remaining cylinders 2, 4, 5, 6 of the printing system 1.

The cellulosic solubilizer comprised in the cleaning composition impregnated in the cleaning fabric 13 will hence dissolve and remove paper residues and other water soluble impurities, for instance calcium carbonate. Thus, there is no need to spray the rubber sheet 3' with water before cleaning the system 1 with the cleaning cassette 10 and the spray bars 17*a*, 17*b* can be omitted.

Other components in the cleaning composition such as the organic solvent(s) will dissolve and remove for instance ink residues on the cylinders 2, 3, 4, 5.

Once the cleaning process has finished, the printing system 1 will rotate the cylinders 2, 3, 4, 5 and damping rollers 6 in the printing direction. This is the opposite direction of that used during the washing procedure. The damping rollers 6 will transfer water from the water bath 9 to the printing cylinders 2, 3, 4, 5 and the cleaning composition which has been used to clean the printing cylinders 2, 3, 4, 5 will be diluted and eventually removed from the printing system 1.

The pre-packed roll 12 comprising the cleaning composition of the present disclosure can be used in already functioning printing systems 1 which uses a cleaning cassette 10 as described and which has a spray device 17*a*, 17*b* installed. The spray device 17*a*, 17*b* can simply be switched off or closed, and the new pre-packed roll 12 can be installed on the mounting means 11 will replace the spray step of the washing process.

In an embodiment (not shown), the cleaning composition may be sprayed onto a dry cleaning fabric before the cleaning process is started. The cleaning process can then be performed as described above without the need for a water spray step to dissolve the paper residues on the blanket cylinder.

In yet another embodiment (not shown), the cleaning composition may be sprayed directly onto the blanket cylinder. The cleaning process can then be performed as described above without the need for a water spray step to dissolve the paper residues on the blanket cylinder.

EXPERIMENTS

The inventor has surprisingly found that the addition of a cellulose solubilizer to a cleaning composition is an effective substitute to the commonly used first washing step of spraying water on to the rubber sheets 3' of the printing cylinder 3. The cellulosic solubilizer is selected from the group consisting of a hydrophilic tenside, a super-wettability agent, a $C_2$-$C_6$ alkane diol, a glycol ether, a compound comprising an ethanol amine moiety or a combination thereof. An exemplary cleaning composition comprising a cellulosic solubilizer is listed in table 1a.

The new cleaning compositions comprising the cellulose solubilizer meet the requirements of a cleaning composition which is illustrated by the experiments presented in the following. Favourable properties of a cleaning composition are ink solubility, low swelling of the rubber sheet 3' when in contact with the cleaning composition, and the dissolution of cellulosic paper residues from the rubber sheet 3'. The results are presented below in tables 2 and 3 and shown in FIGS. 5 and 6.

Example 1

The three organic solvents destillates D100, isooctyl laurate and 2-ethyl hexyl laurate make up the cleaning composition A ($CC_A$) shown in Table 1 below.

An example of a cleaning composition according to an embodiment is presented below in Table 1a. The exemplary cleaning composition according to an embodiment of the present disclosure comprises three organic solvents (destillates D100, isooctyl laurate, 2-ethyl hexyl laurate) and a cellulosic solubilizer (coconut diethanol amide).

The concentration of the three organic solvents is when summarized 95 wt %. The cellulosic solubilizer (CS) in the presented embodiment is coconut diethanolamide. The concentration of the coconut diethanolamide is 5 wt %.

TABLE 1 the composition of the cleaning composition A ($CC_A$)

| | Chemical ingredient | Concentration (wt %) |
|---|---|---|
| $CC_A$ | Distillates (petroleum, hydrotreated light) D100 | 75 |
| | Isooctyl laurate/2-Ethyl hexyl laurate | 25 |

TABLE 1a the composition of a cleaning composition according to an embodiment of the present disclosure comprising the three organic solvents from $CC_A$ and a cellulosic solubilizer (CS).

| | Chemical ingredient | Effect | Concentration (wt %) |
|---|---|---|---|
| $CC_A$ | Distillates (petroleum, hydrotreated light) D100 | Solvent - dissolves ink residues | 75 |
| | Isooctyl laurate | Solvent - dissolves ink residues | 10 |
| | 2-Ethyl hexyl laurate | Solvent - dissolves ink residues | 10 |
| CS | Coconut diethanolamide | Cellulosic solubilizer - dissolves paper residues | 5 |

Experiment 1—Swellability of the Rubber Sheet 3'

When using cleaning compositions in a printing system, one of the requirements of the cleaning composition is that it should not cause the rubber sheet 3' on the blanket cylinder 3 to swell. If the rubber sheet 3' swells too much, the pressure between the rubber sheet 3', on the blanket cylinder 3, and the impression cylinder 2 becomes too high, which results in e.g. poor quality of the prints.

The test is performed by taking a portion of the rubber material used for the rubber sheet in the printing system and placing it on a flat surface (not shown). The thickness of the rubber material is approximately 2 mm. A hollow beaker with no bottom is placed standing on top of the rubber sheet material and filled with the cleaning composition which is to be tested (not shown). The cleaning composition is left in the beaker at a specified temperature (here 40° C.) during a predetermined amount of time (here 24 h). The thickness of the rubber sheet material is measured outside the beaker and acts as a reference height. The height of the area of the rubber sheet material which has been in contact with the cleaning composition is also measured. Finally, the difference between the two heights are calculated as a percentage of the reference height.

The test results for the cleaning composition $CC_A$ according to table 1, and for the a cleaning composition according to the embodiment of Table 1a are presented below in Table 2. The test results for another cleaning composition $CC_B$ and $CC_B$ with the addition of a cellulosic solubilizer (coconut diethanolamide) are also presented below in Table 2. The cleaning composition $CC_B$ comprises an unsaturated fatty acid and a propylene glycol oligomer.

The cleaning compositions remained in contact with the rubber sheet material for 24 hours at 40° C. First, the cleaning compositions $CC_A$ and $CC_B$ were tested without the addition of a cellulosic solubilizer. The swellability of the rubber sheet material then corresponded to 1.42 and 1.97 respectively, as can be seen from Table 2. After the addition of 5% of coconut diethanolamide to $CC_A$ the swellability increased only slightly to 1.59% and after the addition of 5% of coconut diethanolamide to $CC_B$ the swellability increased to 2.59%. Both these values (1.59 and 2.59) are below the threshold value for an approved swellability of the rubber sheet material.

TABLE 2 the test results from the swelling test.

| Swelling test rubber blanket (24 h, 40° C.) | % increased height |
|---|---|
| $CC_A$ | 1.42 |
| $CC_A$ + 5% coconut diethanolamide | 1.59 |
| $CC_B$ | 1.97 |
| $CC_B$ + 5% coconut diethanolamide | 2.59 |

Experiment 2—Ink Solubility

The addition of the water substitute should not decrease the ink solubility of the cleaning composition. If the ink solubility decreases, there is a risk that the cleaning composition will not be able to remove the ink residues from the printing cylinders efficiently during the cleaning process.

The result from the ink solubility test is shown in FIG. 5. On the left side of FIG. 5, two beakers B1, B2 are filled with the cleaning composition $CC_A$. The beaker to the far left B1 also comprises an addition of 5% cellulose solublizer (coconut diethanolamide). The two beakers to the right B3, B4 contain the cleaning composition $CC_B$. The left beaker B3 of the two beakers containing $CC_B$ also comprises an addition of 5% cellulose solubilizer (coconut diethanolamide).

When performing the test, a substrate covered with red ink is lowered into the beaker containing a cleaning composition. The substrate is then lifted out of the beaker and transferred to a paper towel 18. The solubility is visually evaluated by observing the amount of ink on the substrate that has been dissolved by the cleaning composition.

In FIG. 5, the substrates S1, S2, S3, S4 are positioned in front of the beaker in which they have been emerged. Of the two substrates which have been dipped in the cleaning composition $CC_A$, the substrate to the left S1 has more of its ink dissolved than the substrate to the right S2. This means that the cleaning composition $CC_A$ comprising 5% coconut diethanolamide has a higher solubility than the cleaning composition $CC_A$ without the addition of the cellulosic solubilizer coconut diethanolamide.

To the right in FIG. 5, more ink has been dissolved from the substrate S3 which has been lowered into the cleaning composition $CC_B$ comprising 5% coconut diethanolamide (the substrate to the left S3 of the two substrates on the right hand side in FIG. 5). Hence, also the cleaning composition $CC_B$ with a 5% addition of coconut diethanolamide has a higher ink solubility than the cleaning composition without the addition of 5% coconut diethanolamide.

Experiment 3—Paper Residue Wash Test

To evaluate the dissolution of paper residues from the rubber sheet material, a paper residue and ink wash test was performed.

An unwashed rubber sheet blanket 19 of the same type used as the rubber sheet 3', covered with ink and paper residues, was placed on a flat surface. Cleaning compositions with different concentrations of a cellulosic solubilizer (coconut diethanolamide and triethanolamine) were applied on different cloths C1, C2, C3, C4, C5 which were subsequently placed into contact with the dirty rubber sheet blanket 19. The cloths C1, C2, C3, C4, C5 were then manually dragged over the surface five times.

The result shown in FIG. 6 shows the amount of colour and paper fibers that the cloths C1, C2, C3, C4, C5 have removed from the rubber sheet blanket material. A darker colour on the cloth indicates that more colour and paper residues have been dissolved and removed from the rubber sheet material. The result from the experiment is shown in FIG. 6. Table 3 shows the different water substitutes tested in the wash test experiment.

TABLE 3 the table presents the five tests performed in the paper residue wash test.

| Wash test | Cellulosic solubilizer | Concentration (wt %) |
|---|---|---|
| WT1 | Coconut diethanolamide | 5 |
| WT2 | Control (no water substitute used) | — |
| WT3 | Triethanolamine | 5 |
| WT4 | Coconut diethanolamide | 10 |
| WT5 | Coconut diethanolamide | 1 |

The result indicates that a concentration of the cellulosic solubilizer of 5 wt % gave the best result. The results from test WT1 and WT3 shows a darker cloth (C1 and C3 respectively) after the repeated wash of the rubber sheet 19 and hence, they have dissolved more ink and paper residues than the other cloths. The control test WT2 has the cloth C2 with the least dark colour and has hence dissolved least ink and paper residues of all cloths C1, C2, C3, C4, C5. Thus, a cleaning composition according to the present disclosure performs better in a wash test.

Finally, although the inventive concept has been described above with reference to specific embodiments, it is not intended to be limited to the specific form set forth herein. Rather, the invention is limited only by the accompanying claims and other embodiments than the specific above are equally possible within the scope of these appended claims.

The invention claimed is:

1. A roll of cleaning fabric for cleaning printing cylinders of a printing system, said cleaning fabric being impregnated with a cleaning composition, wherein said cleaning composition comprises an organic solvent, a plasticizer, and a cellulose solubilizer; wherein the organic solvent is an ester, wherein the cellulose solubilizer is a glycol ether, wherein the plasticizer is diisononyl phthalate (DINP), and wherein said roll is inserted in a removable sealing bag configured to seal around said roll of the cleaning fabric, said removable sealing bag is adapted and configured to prevent said cleaning composition from evaporating before use, said removable sealing bag is tubular and comprised of a heat sealable, multi-layer plastic film, and said roll of said cleaning fabric is vacuum packed in said sealing bag.

2. The roll according to claim 1, wherein said cleaning composition comprises less than 10 wt % of water.

3. The roll according to claim 2, wherein said cleaning composition comprises less than 2 wt % of water.

4. The roll according to claim 1, wherein the content of the cellulose solubilizer in the cleaning composition is between 0.05 and 20 wt %.

5. The roll according to claim 1, wherein the content of the organic solvent is between 80 and 99.9 wt %.

6. The roll according claim 1, wherein said cleaning fabric is wrapped around a core to form said roll.

7. The roll according to claim 4, wherein the content of the cellulose solubilizer in the cleaning composition is between 0.1 and 5 wt %.

8. The roll according to claim 5, wherein the content of the organic solvent is between 95 and 99.9 wt %.

9. The roll according to claim 1, wherein the ester is a fatty acid ester.

10. The roll according to claim 9, wherein the fatty acid ester is a saturated fatty acid alkyl ester.

11. The roll according to claim 1, wherein the weight concentrations of the ester, the plasticizer and the cellulosic solubilizer is 30 to 50 wt % of the ester, 40 to 60 wt % of the plasticizer and 1 to 5 wt % of the cellulosic solubilizer.

* * * * *